(12) United States Patent
Jeong et al.

(10) Patent No.: US 8,929,445 B2
(45) Date of Patent: *Jan. 6, 2015

(54) APPARATUS FOR CODING OR DECODING INTRA IMAGE BASED ON LINE INFORMATION OF REFERENCE IMAGE BLOCK

(71) Applicant: Electronics and Telecommunications Research Institute, Daejeon (KR)

(72) Inventors: Se Yoon Jeong, Daejeon (KR); Jin Soo Choi, Daejeon (KR); Donghyung Kim, Daejeon (KR); Won-Sik Cheong, Daejeon (KR); Kyung Ae Moon, Daejeon (KR); Jin Woo Hong, Daejeon (KR)

(73) Assignee: Electronics and Telecommunications Reseach Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/182,995

(22) Filed: Feb. 18, 2014

(65) Prior Publication Data

US 2014/0192878 A1   Jul. 10, 2014

Related U.S. Application Data

(63) Continuation of application No. 12/811,765, filed as application No. PCT/KR2008/007733 on Dec. 29, 2008, now Pat. No. 8,699,570.

(30) Foreign Application Priority Data

Jan. 3, 2008 (KR) .................. 10-2008-0000895
Jul. 7, 2008 (KR) .................. 10-2008-0065510

(51) Int. Cl.
*H04N 7/12* (2006.01)
*H04N 19/11* (2014.01)
(Continued)

(52) U.S. Cl.
CPC ... *H04N 19/00042* (2013.01); *H04N 19/00684* (2013.01); *H04N 19/00733* (2013.01);
(Continued)

(58) Field of Classification Search
CPC ............... H04N 19/00042; H04N 19/00139; H04N 19/00278; H04N 19/00303; H04N 19/00684; H04N 19/00733; H04N 19/00763; H04N 19/00781
USPC ..................................................... 375/240.12
See application file for complete search history.

(56) References Cited

U.S. PATENT DOCUMENTS 6,275,533 B1 * 8/2001 Nishi ................... 375/240.24
7,245,659 B2 * 7/2007 Sekiguchi et al. ....... 375/240.12
(Continued)

OTHER PUBLICATIONS

International Search Report and Written Opinion of the International Searching Authority issued on Jun. 25, 2009, in counterpart International Application No. PCT/KR2008/007733 (6 pages, in English).
(Continued)

*Primary Examiner* — Sath V Perungavoor
*Assistant Examiner* — Dakshesh Parikh
(74) *Attorney, Agent, or Firm* — NSIP Law

(57) ABSTRACT

An apparatus for coding an image is provided to effectively code the image. The apparatus for coding the image includes an input image segmentation unit to segment an input image into a plurality of image blocks including a first image block and a second image block. The apparatus also includes a waveform information generation unit to select a plurality of reference pixels from among pixels included in the first image block, generate first waveform information about the first image block based on a pixel value difference between the selected plurality of reference pixels, and generate second waveform information about the second image block based on a pixel value difference between the pixels included in the second image block. The apparatus also includes a coding unit to code an image included in the second image block based on the first waveform information and the second waveform information.

3 Claims, 7 Drawing Sheets

(51) Int. Cl.

| | | |
|---|---|---|
| *H04N 19/51* | (2014.01) | |
| *H04N 19/583* | (2014.01) | |
| *H04N 19/176* | (2014.01) | |
| *H04N 19/61* | (2014.01) | |
| *H04N 19/136* | (2014.01) | |
| *H04N 19/182* | (2014.01) | |
| *H04N 19/593* | (2014.01) | |

(52) U.S. Cl.
CPC ... *H04N 19/00278* (2013.01); *H04N 19/00781* (2013.01); *H04N 19/00139* (2013.01); *H04N 19/00303* (2013.01); *H04N 19/00763* (2013.01)
USPC .................................................. 375/240.12

(56) References Cited

U.S. PATENT DOCUMENTS

| | | | | |
|---|---|---|---|---|
| 2001/0046262 | A1* | 11/2001 | Freda | ........................ 375/240.03 |
| 2006/0039461 | A1 | 2/2006 | Engelmann | |
| 2007/0121731 | A1* | 5/2007 | Tanizawa et al. | ........ 375/240.24 |
| 2007/0168188 | A1 | 7/2007 | Choi | |
| 2007/0274571 | A1 | 11/2007 | Hamza | |
| 2008/0240245 | A1* | 10/2008 | Lee et al. | ................. 375/240.16 |
| 2010/0220790 | A1* | 9/2010 | Jeon et al. | ................. 375/240.16 |

OTHER PUBLICATIONS

U.S. Appl. No. 12/811,765, filed Jul. 6, 2010, Se Yoon Jeong et al., Electronics and Telecommunications Research Institute.

U.S. Appl. No. 14/159,953, filed Jan. 21, 2014, Se Yoon Jeong et al., Electronics and Telecommunications Research Institute.

U.S. Appl. No. 14/182,748, filed Feb. 18, 2014, Se Yoon Jeong et al., Electronics and Telecommunications Research Institute.

U.S. Appl. No. 14/182,898, filed Feb. 18, 2014, Se Yoon Jeong et al., Electronics and Telecommunications Research Institute.

\* cited by examiner

APPARATUS FOR CODING OR DECODING INTRA IMAGE BASED ON LINE INFORMATION OF REFERENCE IMAGE BLOCK

CROSS-REFERENCE TO RELATED APPLICATIONS

This application is a continuation of application Ser. No. 12/811,765 filed on Jul. 6, 2010, which is a U.S. national stage application of International Application No. PCT/KR2008/007733 filed on Dec. 29, 2008. This application claims the benefit of Korean Application Nos. 10-2008-0000895 filed on Jan. 3, 2008, and 10-2008-0065510 filed on Jul. 7, 2008. The entire disclosures of application Ser. No. 12/811,765, International Application No. PCT/KR2008/007733, and Korean Application Nos. 10-2008-0000895 and 10-2008-0065510 are incorporated herein by reference for all purposes.

TECHNICAL FIELD

The present invention relates to an apparatus for coding/decoding an image in a screen, and more particularly, to an apparatus for effectively coding and an apparatus for decoding the effectively coded image. This work was supported by the IT R&D program of MIC/IITA [2007-S-005-01, The Development of Rich Media Broadcasting Technique through enhancement of AV codec.

BACKGROUND ART

The present communication environment is rapidly evolving, transcending boundaries of regions and countries and fields of wired/wireless communication, and this movement is bound to continue its course into the future. In this trend, the communication environment is prepared to integrally provide various information required by users as well as images and voices in a real-time. Digital television systems processing the moving image into digital data, transmitting the digital data in real-time, and mobile communication networks receiving the digital data for displaying the moving image being transmitted in real-time in personal terminals are implemented and popularized.

FIG. 1 is a block diagram illustrating a structure of an apparatus for coding a moving image according to conventional technologies.

Both inter prediction 120 and intra prediction 121 are performed with an input image 110. A switch 140 selects a better prediction method between the inter prediction 120 and intra prediction 121. A difference image between the input image 110 and a prediction image obtained from either the inter prediction 120 or intra prediction 121 is entropy coded 160 via discrete cosine transform (DCT) 130 and quantization 150. Also, the difference image reconstructed in this apparatus for coding the moving image through inverse quantization 151 and inverse DCT 131 is summed with the prediction image obtained through the inter prediction 120 or intra prediction 121, thereby obtaining a reconstructed image. This reconstructed image is used for the intra prediction 121, and a de-blocking filtering 170 is performed on the reconstructed image is used for the inter prediction 120.

In such commercialization process, development of a moving image compression technology functions as a core factor since the moving image compression technology performs quantization with respect to analog image signals, processes special digital processes such as variable length coding, includes the processed signals in digital information and transmits the digital information, and decodes the transmitted digital information received in a terminal, thereby transmitting/receiving more abundant information at a faster transmission speed. To enhance efficiency of the moving image compression, intra prediction mode and inter prediction mode are provided and implemented. In particular, the intra prediction mode is a prediction method exclusively using information within an image frame, without using temporal correlation. As precise prediction is performed, redundancy with an original block to be coded is increased, and an amount of data is minimized by removing redundancy from the original block when actually transmitting, thereby enhancing the compression.

The H.264 coding standard may improve coding efficiency by using coding tools different from conventional arts. The intra prediction coding, which is one of newly used coding tools, predicts a coding target block by using spatial correlation when coding an intra block, and exclusively codes a residual signal between a predicted value and an actual pixel value.

In such intra prediction, there are intra prediction of a 4×4 block unit, intra prediction of an 8×8 block unit, and intra prediction of a 16×16 block unit. In the intra prediction of the 4×4 block unit and the intra prediction of the 8×8 block unit, nine prediction modes are available. In the intra prediction of the 16×16 block unit, four prediction modes are used. In all intra predictions, difference signals and the information regarding the above prediction mode used in the prediction are coded together.

In the case the difference between the predicted value and the actual pixel value is small, it is possible to code a high quality image with identical bits or it is also possible to process coding with lower bits. Therefore, an apparatus for coding an image which is capable of generating prediction values with small differences to the actual pixel value, and an apparatus for decoding which is capable of decoding the coded images generated from the above apparatus are required.

DISCLOSURE OF INVENTION

Technical Goals

The objective of the present invention is to reduce a size of coded images and to improve a quality of the coded images by effectively coding input images.

Technical Solutions

In order to achieve the objective of the present invention and resolve problems of conventional arts, the present invention provides an apparatus for coding an image including an input image segmentation unit to segment an input image into a plurality of image blocks including a first image block and a second image block; a waveform information generation unit to select a plurality of reference pixels from among pixels included in the first image block, generate first waveform information about the first image block based on a pixel value difference between the selected plurality of reference pixels, and generate second waveform information about the second image block based on a pixel value difference between the pixels included in the second image block; and coding unit to code an image included in the second image block based on the first waveform information and second waveform information.

According to an aspect of the present invention, there is provides an apparatus for decoding an image including a reference block waveform information generation unit to generate reference block waveform information based on a pixel value difference between reference pixels included in a reference image block; a prediction pixel value generation unit to generate a prediction pixel value based on the reference block waveform information and a value of a standard pixel included in the reference block; and a decoding unit to decode an image included in a target image block based on the prediction pixel value.

According to another aspect of the present invention, there is provided an apparatus for coding an image including an input image segmentation unit to segment an input image into a plurality of image blocks including a reference image block and a target image block; a reference block waveform information generation unit to select a plurality of reference pixels from among pixels included in the reference image block and generate reference block waveform information based on a value of standard pixel included in the reference block and difference between the selected reference pixels; a prediction waveform information generation unit to generate prediction waveform information based on the reference block waveform information and a value of the standard pixel; and a coding unit to code an image included in the target image block based on the prediction waveform information and a pixel value of coding pixels included in the target image block.

Industrial Applicability

According to the present invention, it is possible to reduce a size of a coded image and to improve a quality of the coded image by effectively coding an input image.

BEST MODE FOR CARRYING OUT THE INVENTION

Hereinafter, exemplary embodiments of the present invention will be described in detail by referring to accompanied drawings.

Figure 1:
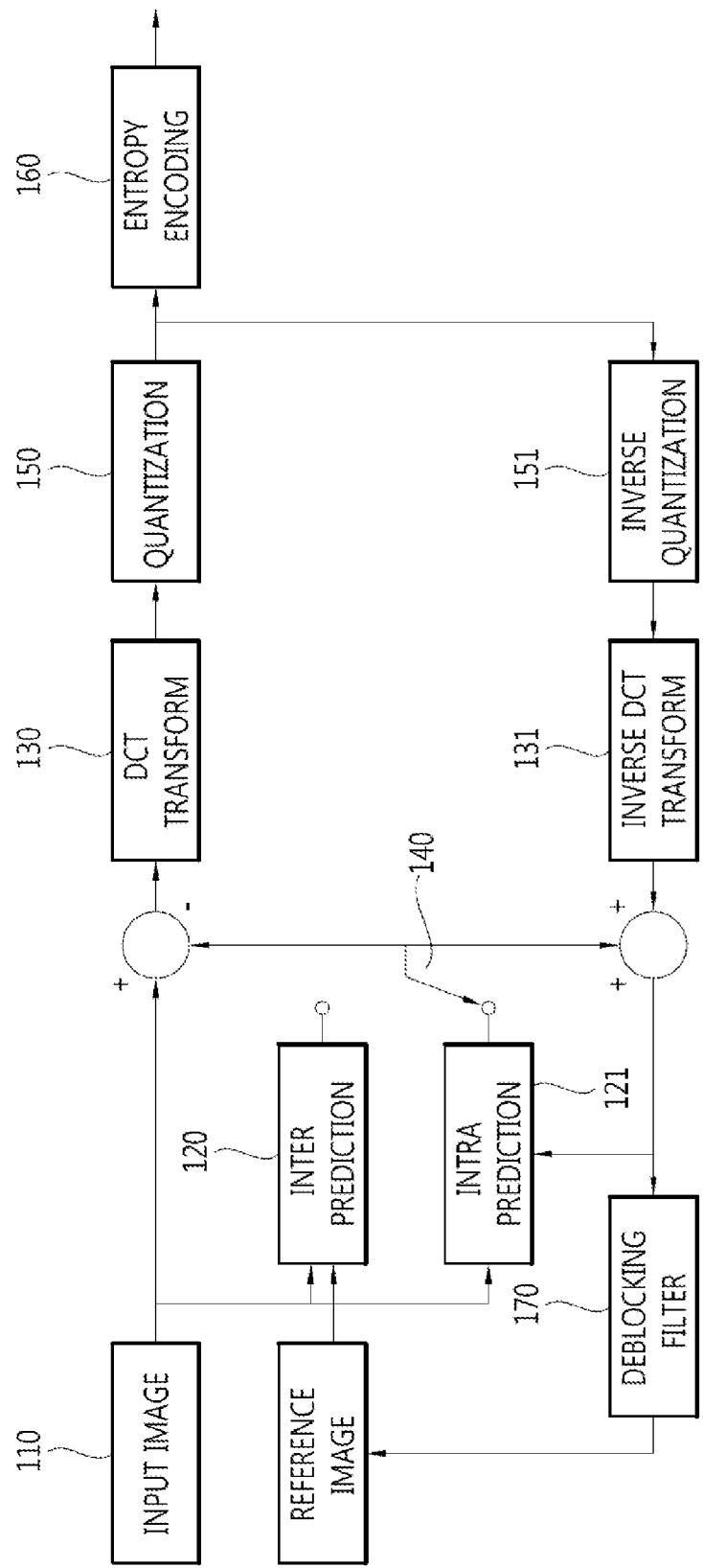
FIG. 1 is a block diagram illustrating a structure of an apparatus for coding a moving image according to conventional technologies.
Figure 2:
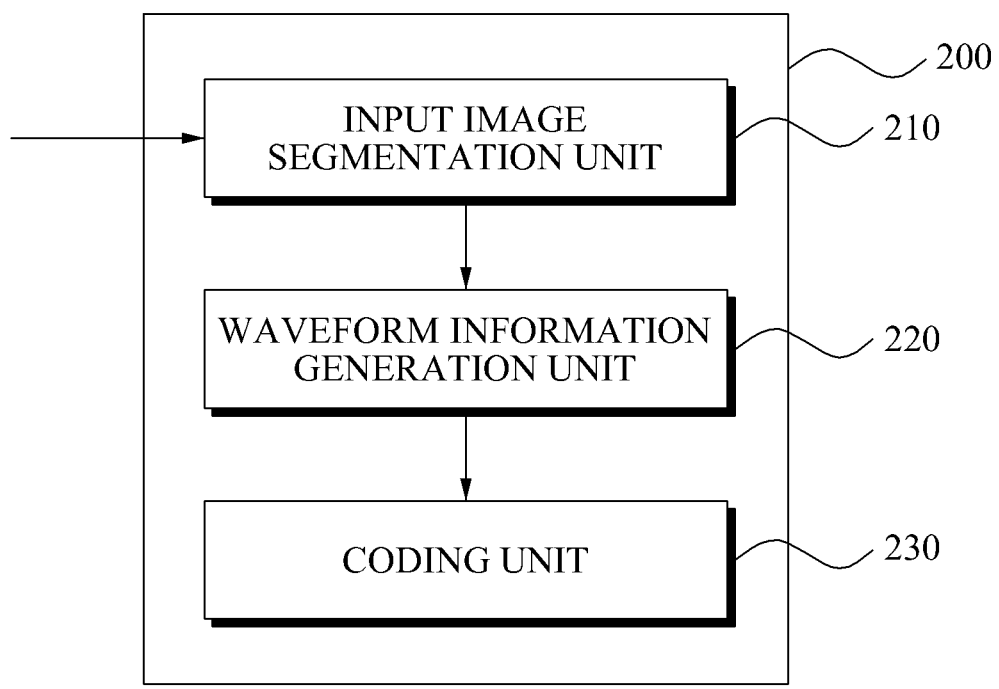
FIG. 2 is a block diagram illustrating a structure of an apparatus for coding an image according to an exemplary embodiment of the present invention.

FIG. 2 is a block diagram illustrating a structure of an apparatus for coding an image according to an exemplary embodiment of the present invention. Hereinafter, operations of the apparatus 200 for coding the image according to the exemplary embodiment of the present invention will be described with reference to FIG. 2. The apparatus 200 for coding the image according to the exemplary embodiment of the present invention may include an input image segmentation unit 210, a waveform information generation unit 220, and a coding unit 230.

The input image segmentation unit 210 segments input images into a plurality of image blocks. A first image block and a second image block are included in the plurality of image blocks.

The waveform information generation unit 220 may generate first waveform information about the first image block and second waveform information about the second image block. The waveform information generation unit 220 may select a plurality of pixels among pixels included in the first image block and generate the first waveform information about the first image block based on differences between pixel values from the selected plurality of pixels. The waveform information generation unit 220 may generate the second waveform information about the second image block based on the differences between pixel values from the second image block.

Waveform information may include pixel value differences from the plurality of pixels included in an identical image block. In other words, among the plurality of pixels included in the first image block, the difference in the pixel value from the first pixel and the second pixel selected may be included. An apparatus for decoding an image which decodes the second image block by referring to the first image block may calculate the pixel value differences in the pixels included in the first image block by referring to the waveform information of the first image block, and decode the second image block based on the calculated pixel value differences. Since the distance between the first pixel and the second pixel in the first image block may be easily calculated, and inclination related to the first and the second pixel value also may be easily calculated. According to the present invention, the apparatus for decoding the image which decodes the second image block may decode the second image block by determining that the inclination related to the pixel values in the plurality of pixels included in the second image block is similar to the inclination related to the pixel values in the plurality of pixels included in the first image block.

The waveform information generation unit 220 may additionally select a third pixel included in the first image block, and waveform may additionally include a pixel value difference from the second pixel and the third pixel. In such case, the first waveform information about the first image block may include the pixel value differences with respect to three pixels. In this instance, the inclination related with the pixel value differences for the first pixel and the second pixel is generally different from the inclination related with the pixel value differences for the second pixel and the third pixel.

According to an exemplary embodiment of the present invention, the second image block may include a fourth pixel, a fifth pixel, and a sixth pixel which correspond to the first pixel, the second pixel, and the third pixel included in the first block respectively. The apparatus for decoding the image which decodes the second image block determines the pixel value for the fourth pixel, the fifth pixel, and the sixth pixel by referring to the inclination related with the first pixel, the second pixel, and the third pixel.

The first block and the second block may be adjacent image blocks.

The second image block is coded based on the first image block. Therefore, in order to decode the second image, information regarding the first image block is required. Since the input image is segmented into a plurality of image blocks, in order to decode the second image block, the first image block is required to be identified. According to an exemplary embodiment of the present invention, the second waveform information may include location information of the first image block with respect to the second image block and the decoding apparatus can identify the first image block from the location information of the first image block with respect to the second image block. The apparatus for decoding the image may decode the second image block based on the identified first image block.

According to an exemplary embodiment of the present invention, the waveform information generation unit 220 may generate the first waveform information about the first image block by selecting a plurality of pixels which are adjacent to each other among the pixels included in the first image block.

According to an exemplary embodiment of the present invention, the waveform information generation unit 220 may generate the first waveform information about the first image block by selecting a plurality of pixels according to a predetermined direction among the pixels included in the first image block.

The coding unit 230 may code an image included in the first image block based on differences between the first waveform information and the second waveform information. According to an exemplary embodiment of the present invention, the first waveform information may include information about a predetermined direction in which the plurality of pixels in the first image block are selected, and the coding unit 230 may code an image included in the second image block based on the direction information of the selected direction in the plurality of pixels of the first image block.

Figure 3:
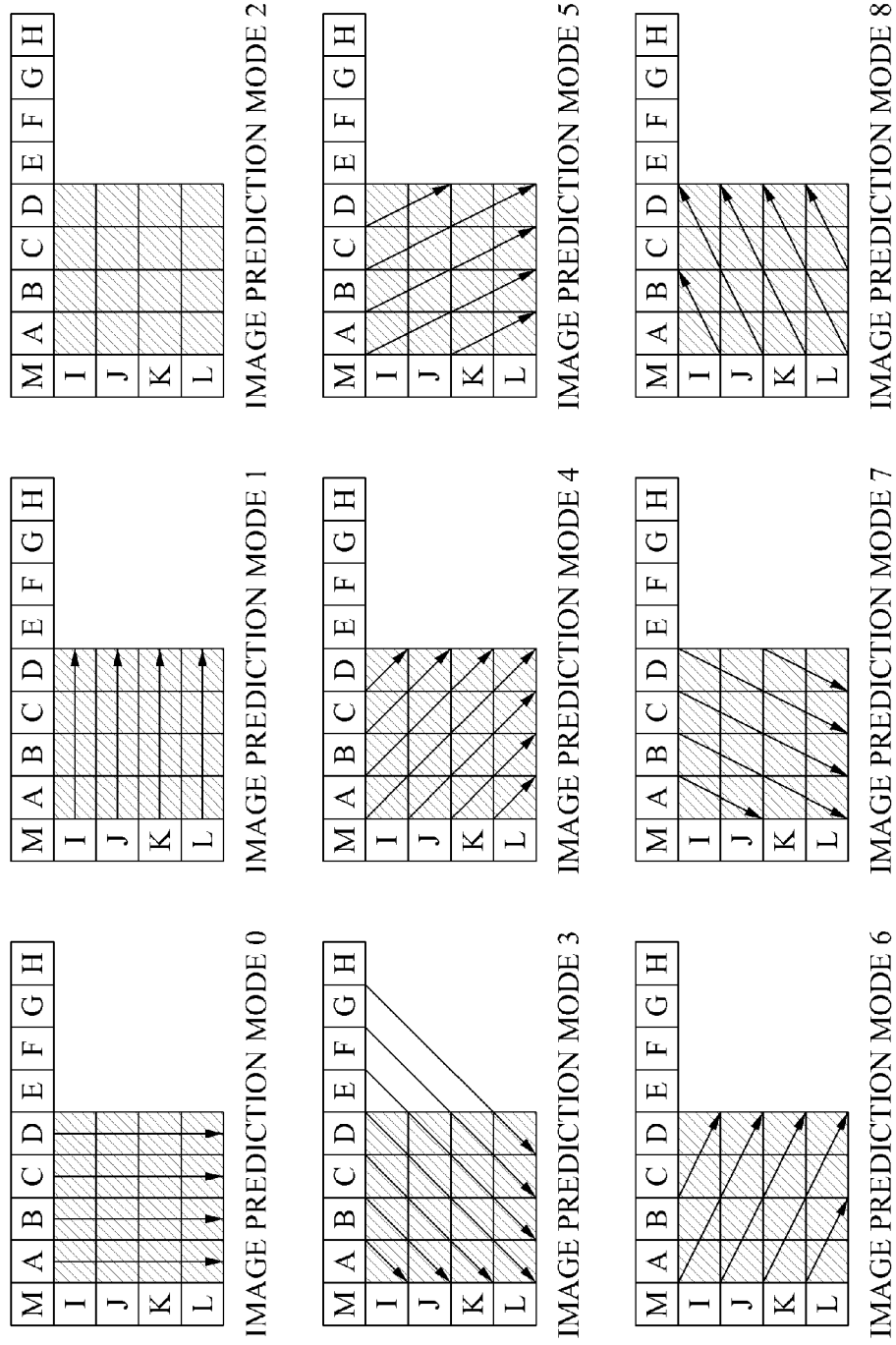
FIG. 3 is a diagram illustrating a direction of a reference block waveform according to an exemplary embodiment of the present invention.

FIG. 3 is a diagram illustrating a direction of a reference block waveforms according to an exemplary embodiment of the present invention. Hereinafter, directions of reference block waveforms according to the exemplary embodiment of the present invention will be described with reference to FIG. 3.

According to an exemplary embodiment of the present invention, the waveform information generation unit 220 of FIG. 2 may select a plurality of pixels according to a predetermined direction within the first image block. According to an exemplary embodiment of the present invention, the waveform information generation unit 220 may determine an image prediction mode for the first image block, and also determine directions to select the plurality of pixels according to the determined image prediction mode.

In FIG. 3, an image prediction mode 0 is an image prediction mode which selects vertical pixels in the plurality of pixels included in the first image block.

An image prediction mode 1 is an image prediction mode which selects horizontal pixels in the plurality of pixels included in the first image block.

An image prediction mode 3 is an image prediction mode which selects pixels of a diagonal downward left direction in the plurality of pixels included in the first image block.

An image prediction mode 4 is an image prediction mode which selects pixels of a diagonal downward right direction in the plurality of pixels included in the first image block.

An image prediction mode 5 is an image prediction mode which selects pixels of a vertical rightward direction in the plurality of pixels included in the first image block.

An image prediction mode 6 is an image prediction mode which selects pixels of a horizontal downward direction in the plurality of pixels included in the first image block.

An image prediction mode 7 is an image prediction mode which selects pixels of a vertical leftward direction in the plurality of pixels included in the first image block.

An image prediction mode 8 is an image prediction mode which selects pixels of a horizontal upward direction in the plurality of pixels included in the first image block.

An image prediction mode 2 is an image prediction mode which selects all pixels in the plurality of pixels included in the first image block.

According to an exemplary embodiment of the present invention, the first waveform information generated from the waveform information generation unit 220 may include the information about the predetermined direction in which the plurality of pixels in the first image block are selected. According to an exemplary embodiment of the present invention, the first waveform information may include the image prediction mode which corresponds to the predetermined direction of the plurality of pixels in the first image block being selected. The apparatus for decoding the image which decodes the image included in the second image block may obtain direction information about the plurality of pixels in the first image block, by referring to the information of the image prediction mode of the first image block. The apparatus for decoding the image may decode an image included in the second image block by referring to the direction information about the predetermined direction of the plurality of pixels of the first image block being selected.

Figure 4:
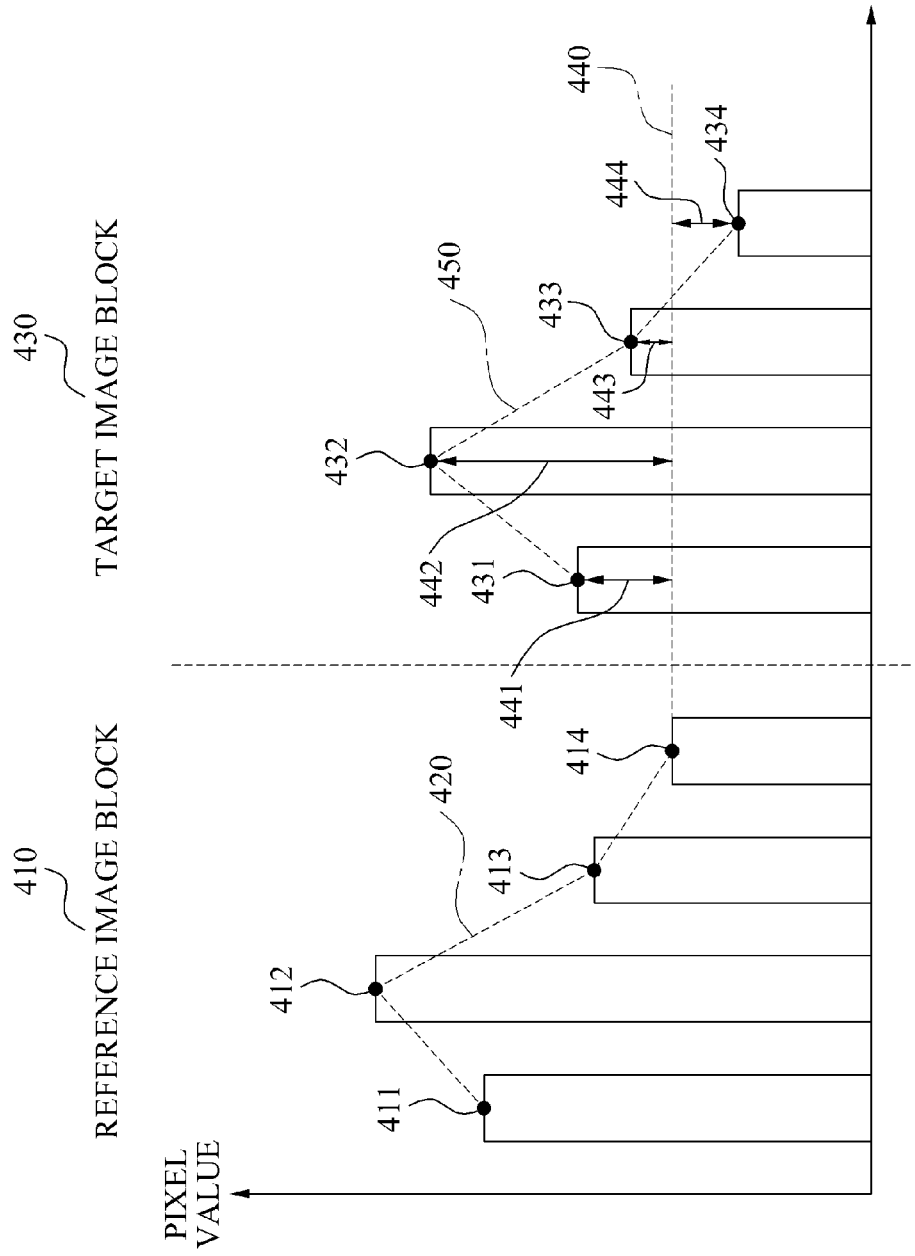
FIG. 4 is a diagram illustrating a conventional method for coding a target image based on a pixel value of a standard pixel included in a reference image block.

FIG. 4 is a diagram illustrating a conventional method for coding a target image block 430 based on a pixel value of a standard pixel included in a reference image block 410.

According to the conventional method for coding the target image, a single standard pixel is selected in a plurality of pixels 411, 412, 413, and 414 which are included in a reference image block 410. According to an exemplary embodiment of the conventional method, a pixel adjacent to the target image block 430 or a pixel closest to the target image block 430 may be selected as a standard pixel.

According to the conventional coding method, a prediction value 440 for pixels 431, 432, 433, and 434 which are included in the target image block 430 is performed using only one pixel 414 from among the pixels included in the reference image block 410, and coding is performed with respect to value difference between the predicted value 440 and the actual pixels 431, 432, 433, and 434. According to the conventional method, in the case the prediction is performed with respect to pixels 431, 432, 433, and 434 included in the target image block 430 exclusively using the single pixel 414, this may result inaccurate predicted values. Consequently, the conventional method may effectively code the target image block 430.

Figure 5:
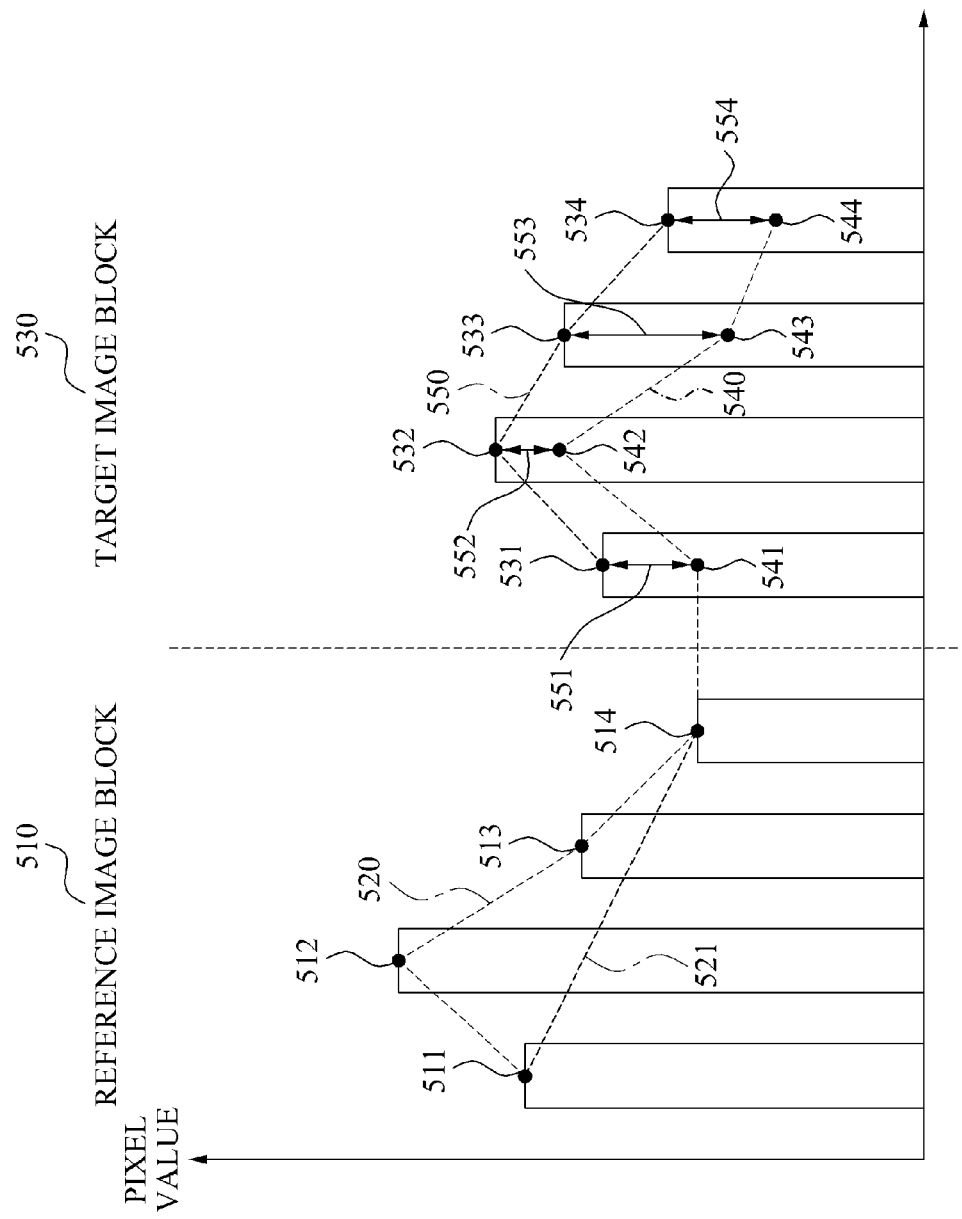
FIG. 5 is a diagram illustrating an exemplary embodiment of the present invention which codes a target image block based on waveform information of a reference image block.

FIG. 5 is a diagram illustrating an exemplary embodiment of the present invention which codes a target image block based on waveform information of a reference image block. Hereinafter, exemplary embodiments of the present invention will be described with reference to FIG. 5. FIG. 5 illustrates an exemplary embodiment that a reference image block is adjacent to a target image block. However, in another exemplary embodiment of the present invention, a reference image block may not be adjacent to a target image block.

An apparatus for coding an image according to an exemplary embodiment of the present invention may generate waveform information of a reference block 520 using pixel values of a plurality of pixels 511, 512, 513, and 514 included in a reference image block 510. According to an exemplary embodiment of the present invention, the reference block waveform information 520 may include information about value differences between the plurality of pixels 511, 512, 513, and 514 which are included in the reference image block 510.

In general, a size of the reference image block 510 or of the target image block 530 is 4×4 or 16×16. The target image to be coded is segmented into plurality of image blocks before being coded. The adjacent image blocks may include similar images. Each of the image blocks having similar images may include a plurality of pixels with similar patterns.

In the case pixels 511, 512, 513, and 514 of the reference image block 510 have similar patterns 520 and 521, the reference block waveform information 520 which connects values of the plurality of pixels 511, 512, 513, and 514 included in the reference image block 510 is similar to the target block waveform information 550 which connects values of the plurality of pixels 531, 532, 533, and 534 of the target image block 530.

Consequently, it is possible to code the target image block 530 based on the reference block waveform information 520 which includes values of the plurality of pixels 511, 512, 513, and 514 included in the reference image block 510, as well as based on a value of the standard pixel 514 included in the reference image block 510.

The apparatus for coding the image according to an exemplary embodiment of the present invention may generate prediction waveform information 540 about the target image block 530 using the reference block waveform information 520. According to an exemplary embodiment of the present invention, the apparatus for coding the image may generate the prediction waveform information 540 using the value difference information between the plurality of pixels 511, 512, 513, and 514 included in the reference image block 510.

The apparatus for coding the image may generate the reference block waveform information 521 exclusively using a portion of pixels 511, 512, 513, and 514 included in the reference image block 510. The apparatus for coding the image may also generate reference block waveform information 521 exclusively using a first pixel 511 and a last pixel 514 from among the reference image block 510. In the case the reference block waveform information 521 is generated in a simplified way by exclusively using the portion of pixels, a load of calculation may be reduced.

The apparatus for coding the image according to an exemplary embodiment of the present invention may select the standard pixel 514 from among the plurality of pixels 511, 512, 513 and 514 included in the reference image block 510, determine the prediction waveform information 540 based on the pixel value of the standard pixel 514. According to an exemplary embodiment of the present invention, it is possible to determine the pixel value of the first prediction pixel 541 by referring to the pixel value of the standard pixel 514 from among the plurality of prediction pixel values 541, 542, 543, and 544 included in the prediction waveform information 540.

Since the reference block waveform information 521 includes information regarding relative pixel differences among the plurality of pixels 511, 512, 513, and 514 included in the reference image block 510, the apparatus for coding the image may determine the plurality of prediction pixel values of 541, 542 543, and 544 included in the prediction waveform information 540 by referring to the pixel value of the standard pixel 514.

According to an exemplary embodiment of the present invention, the apparatus for coding the image may determine either a closest pixel or an adjacent pixel to the target image block 530 from among the plurality of pixels 511, 512, 513, and 514 included in the reference image block 510 as the standard pixel 514. The closest pixel to the target image block 530 or the adjacent pixel 514 to the target image block 530 tends to have a small difference value from pixel values of the target image block 530 in general. Consequently, there are small differences between the prediction waveform information 540 and the plurality of pixels 531, 532, 533, and 534 included in the actual target image block 530.

The apparatus for coding the image according to an exemplary embodiment of the present invention is capable of coding value differences 551, 552, 553, and 554 between the plurality of pixels included in the target image block 530 and the prediction waveform information 541, 542, 543, and 544 corresponding to each of the pixels.

A range of possible values in the value differences 551, 552, 553, and 554 between the plurality of values 531, 532, 533, and 534 included in the target image block 530 and prediction waveform information 541, 542, 543, and 544 is smaller than a range of possible values in the plurality of possible pixels 531, 532, 533, and 544 included in the target image block 530. Also, the range of possible values in the value differences 551, 552, 553, and 554 between the plurality of pixel values 531, 532, 533, and 534 of the target image block 530 and prediction waveform information 541, 542, 543 and 544 is smaller than the range of possible values in the value differences of a pixel value of the standard pixel 514 and the plurality of pixel values 531, 532, 533, and 534.

Consequently, according to the present invention, it is possible to code a specific pixel using a smaller amount of bits. Also, with a same amount of bits, it is possible to code the specific pixel to a better quality. Since a size of the coded image decreases, transmission in both wired and wireless communication becomes more convenient.

FIG. 5 illustrates an exemplary embodiment that the standard pixel is included in the reference image block. However, according to another exemplary embodiment of the present invention, a standard pixel may be included in a target image block as well. According to an exemplary embodiment of the present invention, a pixel in the target image block, which is located in a boundary toward the reference image block, may be selected as the standard pixel. In such case, a pixel value difference between the standard pixel and the prediction waveform information is not coded, but a pixel value of the standard pixel is coded.

Also, FIG. 5 illustrates an exemplary embodiment that only four reference pixels are selected among the pixels in the four reference image blocks 510, yet in another exemplary embodiment of the present invention, it is possible to select more than 4 pixels for reference pixels to generate prediction waveform information.

Figure 6:
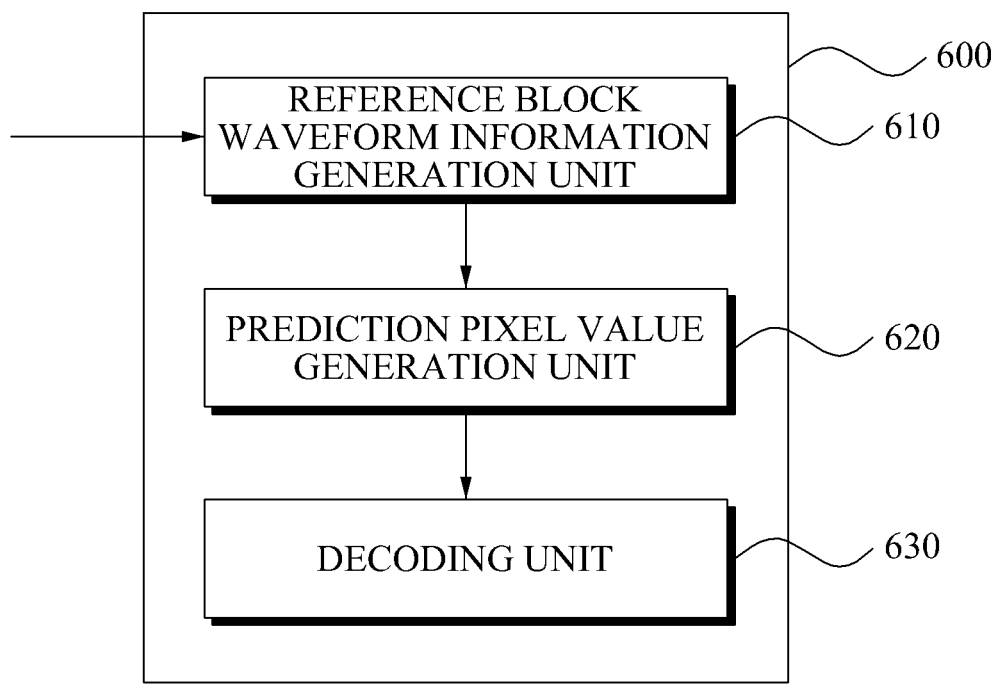
FIG. 6 is a block diagram illustrating a structure of an apparatus for decoding an image according to an exemplary embodiment of the present invention.

FIG. 6 is a block diagram illustrating a structure of an apparatus 600 for decoding an image according to an exemplary embodiment of the present invention. The apparatus 600 for decoding the image according to an exemplary embodiment of the present invention may include a reference block waveform information generation unit 610, a prediction pixel value generation unit 620, and a coding unit 630.

The reference block waveform information generation unit 610 may generate reference block waveform information based on pixel value differences of reference pixels included in the reference image block. The reference block waveform information generation unit 610 according to an exemplary embodiment of the present invention may select pixels which are arranged to a predetermined direction among the reference pixels included in the reference image block, and generate reference waveform information based on the value differences between the selected pixels. According to an exemplary embodiment of the present invention, the reference block waveform information generation unit 610 may generate reference block waveform information by comparing pixel values of pixels which are adjacent with each other from among the selected pixels. Since all of the selected pixels are used in generation of reference block waveform information, the generated reference block waveform information is highly accurate.

According to another exemplary embodiment of the present invention, the reference block waveform information generation unit 610 may generate reference block waveform information by exclusively comparing pixel values of only a portion of pixels from among the selected pixels. Since only the portion of pixels is used in the generation of the reference block waveform information, the reference block waveform information may be easily generated. According to an exemplary embodiment of the present invention, the reference block waveform information generation unit 610 may generate the reference block waveform information exclusively using the first pixel and the last pixel from among the selected pixels.

The prediction pixel value generation unit 620 may generate prediction pixel value based on a pixel value of a standard pixel within the reference block waveform information or the reference image block. The reference block waveform information only includes information about a pixel value difference between selected pixels. Consequently, information such as whether the first pixel value is smaller than the second pixel value may be included in the reference block waveform information, however information of an exact value of the first pixel value may not be included in the reference block waveform information.

The prediction pixel value generation unit 620 may generate a prediction pixel value based on a pixel value of a standard pixel. According to an exemplary embodiment of the present invention, the standard pixel may be selected among the selected reference pixels. According to an exemplary embodiment of the present invention, among the selected reference pixels, a pixel closest to a target image block or a pixel adjacent to a reference image block may be selected as a standard pixel. According to an exemplary embodiment of the present invention, among the selected reference pixels, a pixel located in a boundary toward the target image block may be selected as the standard pixel. The prediction pixel value generation unit 620 may generate a prediction pixel value by referring to the location information of the selected standard pixel.

According to an exemplary embodiment of the present invention, the prediction pixel value generation unit 620 may select the standard pixel from pixels of the target image block.

According to an exemplary embodiment of the present invention, the prediction pixel value generation unit 620, among the plurality of pixels included in the target image block, may determine a pixel value of a pixel which is closest to the reference image block to be identical to a pixel value of a standard pixel. Also, the prediction pixel value generation unit 620 may generate prediction pixel values which correspond to each of the pixels of the target image block. Connecting each of the prediction pixel values would result generation of prediction waveform information. According to an exemplary embodiment of the present invention, the prediction pixel value generation unit 620 may determine the prediction pixel value so that a form of the prediction waveform information is identical to a form of the reference block waveform information.

The decoding unit 630 may decode an image included in the target image block based on the prediction pixel values. According to an exemplary embodiment of the present invention, the decoding unit 630 may calculate decoding data values for the target image block, add the calculated decoding data values and prediction pixel values, and decode the image included in the target image block.

The reference image block and the target image block may be image blocks adjacent to each other, however, according to another exemplary embodiment of the present invention, a reference image block and a target image block may also not be adjacent.

The apparatus for coding the image may code only differences between the pixel values of pixels included in the target image block and prediction pixels, and the decoding unit 630 may calculate an accurate value of pixels included in the target image block based on the prediction pixel values.

A range of a difference between the pixel values of pixels included in the target image block and the prediction pixel value is smaller than a range of the values of pixels included in the target image block. Consequently, coding of the differences between the values of pixels included in the target image block and the prediction pixel values may improve overall effectiveness in coding of an input image, compared to the case of coding with the pixel values from the target image block alone.

According to the present invention, it is possible to code/decode input images using a fewer number of bits than the conventional technology. It is also possible to code/decode images with higher quality using a same number of bits as the conventional art. Since a size of the coded image is reduced, transmissions via both wired and wireless networks may be easy.

According to an exemplary embodiment of the present invention, the prediction pixel value generation 620 may generate a prediction pixel value based on a direction of the reference image block in relation to the target image block. According to an exemplary embodiment of the present invention, in the case the reference block is located in an upper direction, a prediction mode for the prediction image block may be '0'. In the case a prediction mode for a prediction image block is '0', the apparatus for coding the image may generate the reference block waveform information by selecting reference pixels which are vertical from among the reference pixels in the reference image block. The direction of the selected reference pixels is identical to a direction of the target image block from the reference image block. The prediction pixel value generation unit 620 may generate prediction pixel values for image pixels whose direction is identical to that of the selected reference pixels, from among the image pixels included in the reference image block. In the case the direction of the selected reference pixels is identical to the direction of the prediction pixels, a deviation between pixel values of the selected reference pixels and the prediction pixel values may be minimized.

Figure 7:
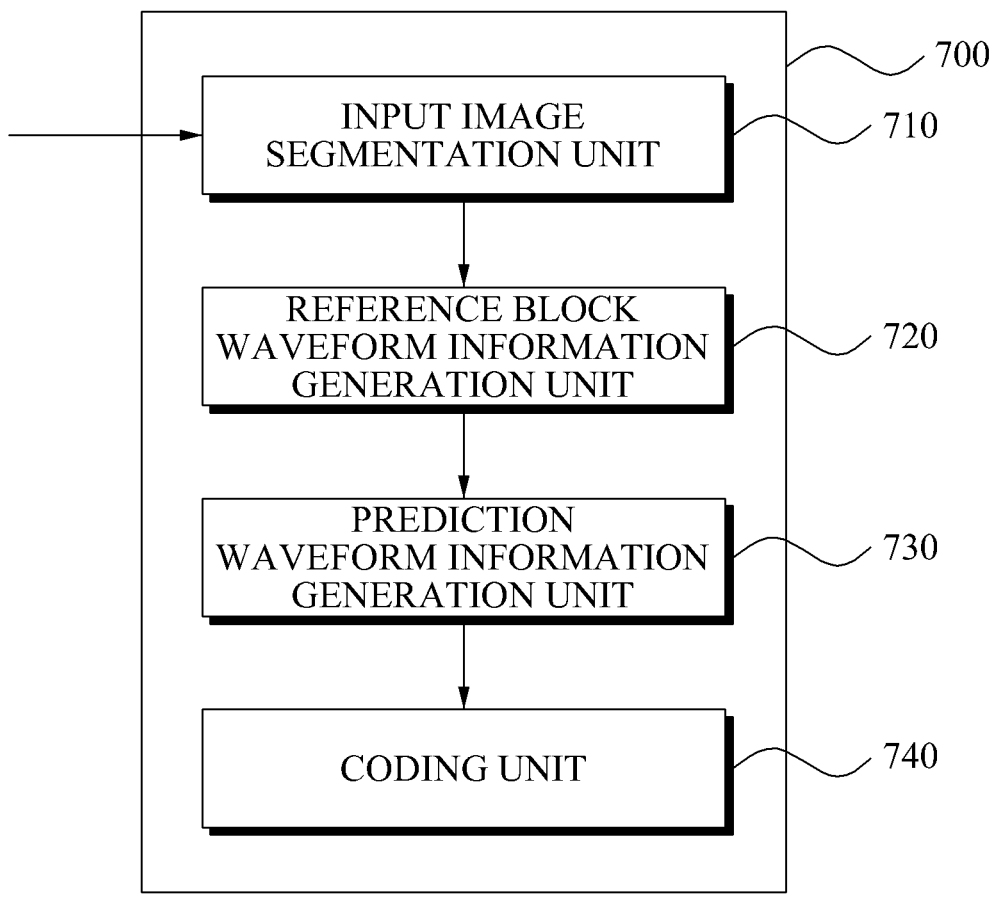
FIG. 7 is a block diagram illustrating a structure of an apparatus for coding an image according to an exemplary embodiment of the present invention.

FIG. 7 is a block diagram illustrating a structure of an apparatus for coding an image according to an exemplary embodiment of the present invention. The apparatus for coding the image according to an exemplary embodiment of the present invention may include an input image segmentation unit 710, a reference block waveform information generation unit 720, and a prediction waveform information generation unit 730, and a coding unit 740.

The input image segmentation unit 710 may segment an input image into a plurality of blocks which includes a reference image block or a target image block. According to an exemplary embodiment of the present invention, the reference image block and target image block may be image blocks adjacent to each other. However, the reference image block and target image block may not be adjacent to each other according to another exemplary embodiment of the present invention.

The reference block waveform information generation unit 720 may select the plurality of reference pixels from among pixels included in the reference image block, and generate reference block waveform information based on pixel value differences between the selected reference pixels. The generated reference block waveform information only includes information about a relative difference in pixel values between the reference pixels.

According to an exemplary embodiment of the present invention, the reference block waveform information generation unit 720 may generate reference block waveform information based on the pixel value differences of reference pixels adjacent to each other. Since all reference pixels included in the reference image block are used in the generation of the reference block waveform information, it is possible to generate more accurate waveform information. In another exemplary embodiment of the present invention, the reference block waveform information generation unit 720 may also generate reference block waveform information using only a portion of reference pixels from the selected reference pixels. In this instance, since the reference block waveform information generation unit 720 generates the reference block waveform information in a simplified way, a computational load decreases.

The prediction waveform information generation unit 730 may generate prediction waveform information based on a standard pixel value included in the reference block waveform information and reference image block. The standard pixel value is a pixel value of a standard pixel included in the reference image block. According to an exemplary embodiment of the present invention, the prediction waveform information generation unit 730 may select the standard pixel using a pixel adjacent to a target image block from among all pixels included in the reference image block. Also, the prediction waveform information generation unit 730 may select a pixel, which is located in a boundary toward the target image block from among all pixels included in the reference image block, as the standard pixel.

When the pixel, which is located in a boundary toward the target image block, is selected from among all pixels included in the reference image block, the prediction waveform information generation unit 730 may determine a pixel value of the standard pixel as a starting value of the prediction waveform information. Since a distance between the standard pixel and the target image block is significantly close, pixel value differences between pixels included in the target image block and the standard pixel are significantly small. Thus, it is possible to effectively code the target image block.

According to an exemplary embodiment of the present invention, in the case the reference block and the target image block are not adjacent to each other, the prediction waveform information generation 730 may generate prediction waveform information based on the distance from the reference image block to the target image block. According to an exemplary embodiment of the present invention, the prediction waveform information generation 730 may calculate an inclination value of the reference block waveform information, and also may obtain a starting value of the prediction waveform information based on the calculated inclination value. The prediction waveform information generation unit 730 may generate the prediction waveform information based on relative pixel value differences between the starting value of the prediction waveform information and the pixel value of the reference pixel.

According to an exemplary embodiment of the present invention, the reference block waveform information generation unit 720 may select the plurality of reference pixels according to a predetermined direction, and the prediction waveform information generation unit 730 may generate the prediction waveform information based on the predetermined direction in which the reference pixels are selected. According to an exemplary embodiment of the present invention, the reference block waveform information generation unit 720 may determine the predetermined direction in which the reference pixels are selected based on a direction of the target image block from the reference image block.

The coding unit 740 may code an image included in the target image block based on a pixel value of coding pixels included in the prediction waveform information and the target image block. According to an exemplary embodiment of the present invention, the coding unit 740 may code a pixel difference between the coding pixels included in the prediction waveform information and the target image block.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

Therefore, it is intended that the scope of the invention be defined by the claims appended thereto and their equivalents.

What is claimed is:

1. A method for decoding an image, the method comprising:
   generating waveform information that represents differences in pixel values between pixels of a predetermined direction neighboring a target image block;
   generating prediction pixel values for pixels in the target image block based on the waveform information; and
   outputting pixel values of the pixels in the target image block based on the prediction pixel values,
   wherein the pixels of the predetermined direction neighboring the target image block are selected from reference image blocks neighboring the target image block, and
   the generating of the prediction pixel values for pixels in the target image block comprises generating the prediction pixel values for pixels in the target image block that are adjacent to predetermined reference pixels among the pixels of the predetermined direction neighboring the target image block.

2. The method of claim 1, wherein the outputting of the pixel values of the pixels in the target image block comprises decoding the target image block by adding each of the prediction pixel values to a coding data value for a respective pixel of the target image block to obtain a pixel value of the respective pixel of the target image block.

3. The method of claim 1, wherein the waveform information is generated based on pixels that are adjacent to the target image block among the pixels of the predetermined direction neighboring the target image block.

* * * * *